United States Patent
Toshimitsu et al.

(10) Patent No.: US 8,923,174 B2
(45) Date of Patent: Dec. 30, 2014

(54) WIRELESS APPARATUS CAPABLE OF REDUCING RECEIVER POWER

(75) Inventors: Kiyoshi Toshimitsu, Shibuya-ku (JP); Masahiro Takagi, Toshima-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1194 days.

(21) Appl. No.: 12/539,718

(22) Filed: Aug. 12, 2009

(65) Prior Publication Data

US 2010/0039974 A1 Feb. 18, 2010

(30) Foreign Application Priority Data

Aug. 12, 2008 (JP) .................. 2008-207762

(51) Int. Cl.
*G08C 17/00* (2006.01)
*H04W 52/02* (2009.01)

(52) U.S. Cl.
CPC ............ *H04W 52/0225* (2013.01); *Y02B 60/50* (2013.01)
USPC ..... 370/311; 370/338; 455/343.1; 455/343.4; 455/522

(58) Field of Classification Search
CPC .................... H04L 29/06578; H04L 29/06605
See application file for complete search history.

(56) References Cited

U.S. PATENT DOCUMENTS

| | | | |
|---|---|---|---|
| 2003/0236082 A1* | 12/2003 | Aoki et al. ................ | 455/278.1 |
| 2005/0037802 A1 | 2/2005 | Nakajima et al. | |
| 2005/0163070 A1* | 7/2005 | Farnham et al. ............. | 370/328 |
| 2009/0052417 A1 | 2/2009 | Sakamoto et al. | |
| 2009/0067356 A1 | 3/2009 | Sakamoto et al. | |

FOREIGN PATENT DOCUMENTS

JP 2003-348104 12/2003

* cited by examiner

*Primary Examiner* — Jackie Zuniga Abad
(74) *Attorney, Agent, or Firm* — Amin, Turocy & Watson, LLP (57) ABSTRACT

A wireless apparatus that periodically sends notification signals, including: a determining module that determines, before sending the notification signal, whether a wireless channel is being used by a wireless device; a sending module that sends the notification signal if the wireless channel is not used throughout a first period; a receiving module; a controller that controls the receiving module to be able to receive a signal until a lapse of a second period after transmission of the notification signal; and a suspending module that suspends supply of power to the receiving module if a signal is not received in the second period and the number of wireless devices that can communicate with the apparatus is zero. If the receiving module receives a signal in the second period, the controller controls the receiving module to be able to receive a signal after a lapse of the second period.

18 Claims, 8 Drawing Sheets

| Element ID | Length | Duration |
|---|---|---|

WIRELESS APPARATUS CAPABLE OF REDUCING RECEIVER POWER

CROSS-REFERENCE TO RELATED APPLICATIONS

The entire disclosure of Japanese Patent Application No. 2008-207762 filed on Aug. 12, 2008, including specification, claims, drawings and abstract is incorporated herein by reference in its entirety.

BACKGROUND

1. Field of the Invention

The present invention relates to a wireless apparatus.

2. Description of the Related Art

Among techniques for reducing power consumption of a wireless LAN base station (access point), there is a technique of reducing the power consumption that is necessary for sending notification signals by suspending beacon transmissions while there is no terminal being in a state that it can communicate with the base station (see JP-A-2003-348104, for instance).

In general, wireless LAN base stations perform beacon transmissions at a constant cycle (e.g., 100 ms). During periods other than the periods of beacon transmissions, wireless LAN base stations perform a standby receiving operation in preparation for reception of a wireless signal.

In such a base station, whereas beacon transmission periods are hundreds of microseconds, standby reception periods are 90 ms or more. Therefore, even if beacon transmissions are suspended to reduce the power consumption of the base station, its power consumption reducing effect is small.

Specific examples of numerical values will be shown below. It is assumed that the power consumption of a signal processor and an analog processor of a base station is 785 mW during beacon transmissions, 230 mW during standby receiving operations, and 230 µW in a sleep mode.

First, where the base station performs beacon transmissions of 100 bytes at a rate of 6 Mbps at a cycle of 100 ms, an average power consumption is calculated as (785 mW×0.133 ms+230 mW×99.867 ms)/100 ms=230.73 mW. In this equation, 0.133 ms is a calculation result of 800 bits/6 Mbps.

On the other hand, when the base station suspends beacon transmissions, an average power consumption is calculated as 230 mW×100 ms/100 ms=230 mW.

That is, even if the technique disclosed in JP-A-2003-348104 is applied to the above base station, the reduction in power consumption is as small as 0.73 mW.

In the technique disclosed in JP-A-2003-348104, the power consumption that is necessary for standby receiving operations of a base station cannot be reduced sufficiently.

On the other hand, suspending standby receiving operations as well as beacon transmissions while there is no terminal being in a state that it can communicate with a base station may prevent the base station from receiving even such wireless signals as a connection request and an authentication request from a terminal. In this case, terminals cannot start a communication with the base station; users cannot use their terminals while the base station is suspending standby operations. The convenience of the users is thus lowered.

Particularly in the wireless LAN, according to Carrier Sense Multiple Access with Collision Avoidance (CSMA/CA), while a wireless channel is not being used by another terminal (in an idle state), a wireless signal is transmitted from a terminal on that wireless channel. Therefore, a base station cannot know in advance when the terminal will send a connection request or an authentication request.

This problem is specific to the wireless LAN that employs CSMA/CA. That is, such schemes as TDMA in which a timing of a wireless signal transmission from a terminal can be transmitted in advance are free of this problem.

SUMMARY

According to an aspect of the invention, there is provided a wireless apparatus configured to send a notification signal at intervals of a certain period, the notification signal including information for identification of the wireless apparatus, the wireless apparatus including: a memory configured to store the number of wireless devices that are in such a state as to be able to communicate with the wireless apparatus; a determining module configured to determine, before sending the notification signal, whether a wireless channel to be used for sending the notification signal is being used by a wireless device; a sending module configured to send the notification signal if the wireless channel has not been used by any wireless devices throughout a first period; a receiving module configured to receive a signal that enables a communication with the wireless apparatus; a controller configured to control the receiving module so that a signal transmitted from a wireless device is receivable until a lapse of a second period after transmission of the notification signal; and a suspending module configured to suspend supply of power to the receiving module if a signal has not been received from any wireless devices in the second period and the number of wireless devices stored in the memory is zero, wherein, if the receiving module receives a signal transmitted from a wireless device in the second period, the controller controls the receiving module so that a signal transmitted from the wireless device is receivable even after a lapse of the second period.

BRIEF DESCRIPTION OF THE DRAWINGS

Embodiment may be described in detail with reference to the accompanying drawings, in which.

DETAILED DESCRIPTION OF THE EMBODIMENTS

Embodiments of the present invention will be hereinafter described.

(First Embodiment)

Figure 1:
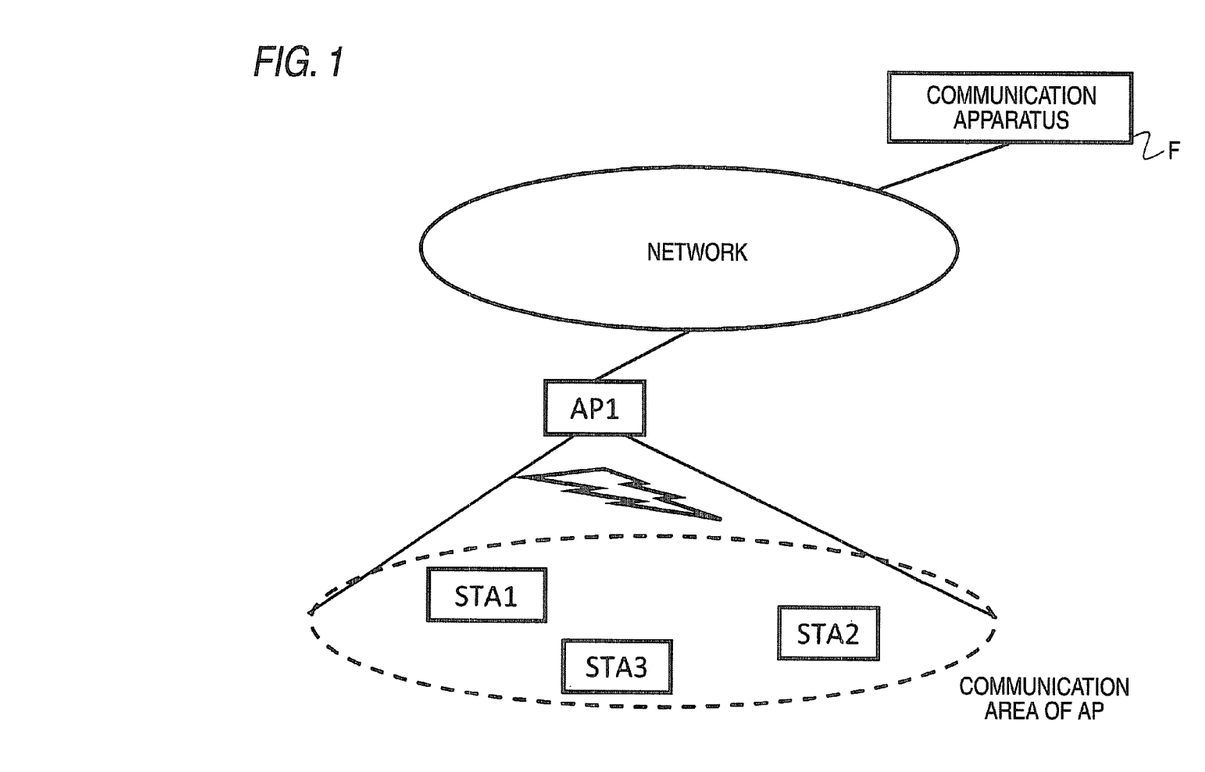
FIG. 1 is an exemplary block diagram showing a configuration of a communication system according to a first embodiment of the present invention.

FIG. 1 is a block diagram of a communication system according to a first embodiment of the invention.

The communication system according to the first embodiment is provided with an access point AP1 and three wireless terminals STA1, STA2, and STA3. The access point AP1 communicates with a communication apparatus F over a wired network and communicates with the wireless terminals STA1, STA2, and STA3 using wireless channels. The access point AP1 mediates a communication between the wireless terminals STA1, STA2, and STA3. The access point AP1 mediates a communication between any of the wireless terminals STA1, STA2, and STA3 and the communication terminal F. A range of reach of wireless waves emitted from the access point AP1 is called a communication area of the access point AP1.

The access point AP1 and the wireless terminals STA1, STA2, and STA3 comply with the wireless LAN standard, for example, and send a signal according to CSMA/CA. Each of the access point AP1 and the wireless terminals STA1, STA2, and STA3 sends a signal if a wireless channel to be used for the transmission has not been used for a certain time straight by another wireless terminal.

Figure 2:
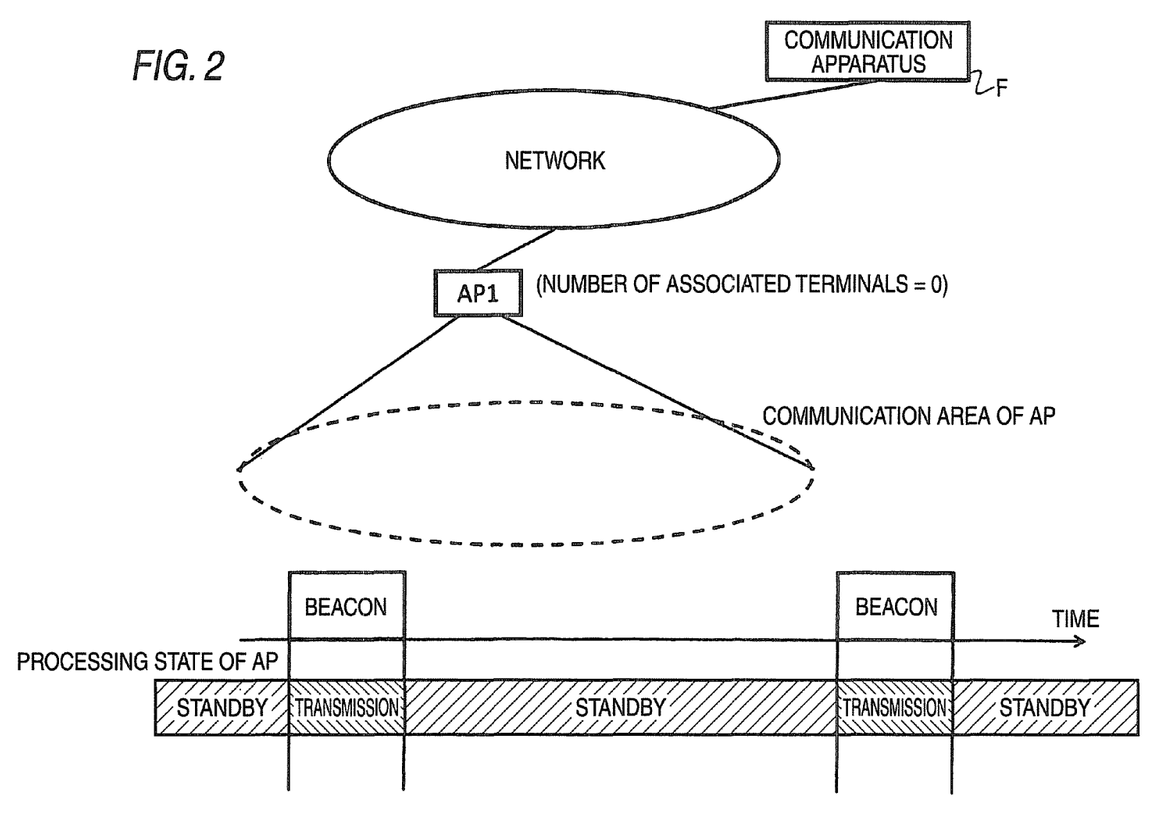
FIG. 2 shows an exemplary configuration of the communication system according to the first embodiment of the invention and an operation of an access point.

FIG. 2 is a block diagram of an example communication system in which no wireless terminal exists in the communication area of the access point AP1 and a time chart of processing of the access point AP1. In the example of FIG. 2, there is no wireless terminal being in a state that it can communicate with (i.e., it is associated with) the access point AP1.

Since no wireless terminal exists in the communication area, the access point AP1 does not mediate a communication between wireless terminals or between a wireless terminal and a communication apparatus F. Assuming that a wireless terminal will newly enter the communication area, the access point AP1 sends notification signals (e.g., beacon signals) on a regular basis (e.g., at a cycle of 100 millisecond). The notification signal maybe any kind of signal as long as it contains information for identification of the access point AP1.

A wireless terminal that has newly entered the communication area of the access point AP1 determines to what access point connection should be made based on information contained in each notification signal, a reception state of each notification signal, and other information. If determining that connection should be made to the access point AP1, the wireless terminal sends the access point AP1 a connection request signal (e.g., association request) for enabling a communication with the access point AP1 (i.e., for enabling connection).

Incapable of knowing when a wireless terminal that will newly enter the communication area will send a connection request signal, the access point AP1 maintains a state (standby state) that it can receive signals from wireless terminals except during transmission of notification signals.

Figure 3:
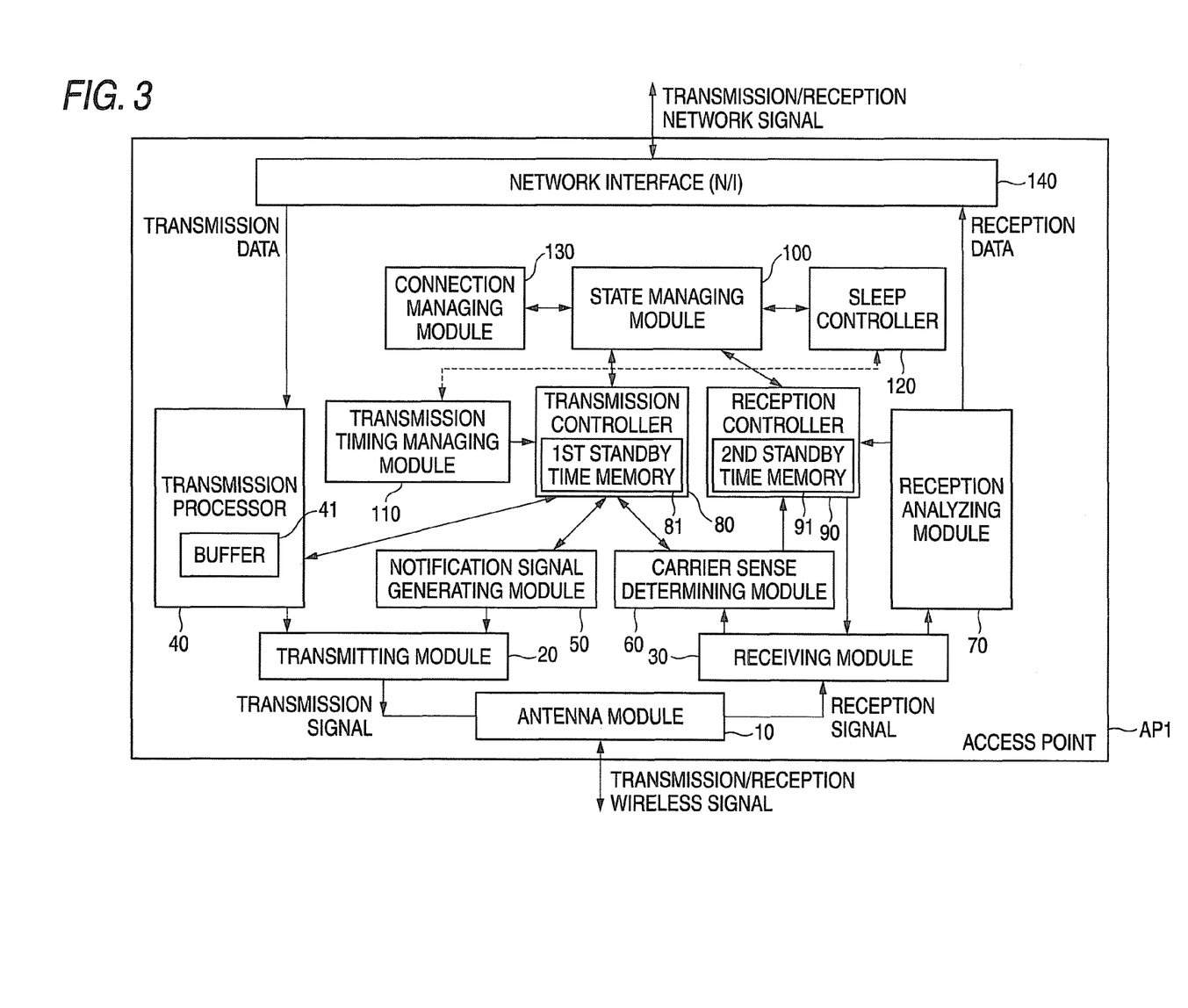
FIG. 3 is an exemplary block diagram showing the configuration of the access point according to the first embodiment of the invention.

FIG. 3 is a block diagram showing the configuration of the access point AP1 according to the first embodiment.

The access point AP1 is equipped with an antenna module 10, a transmitting module 20, a receiving module 30, a transmission processor 40, a notification signal generating module 50, a carrier sense determining module 60, a reception analyzing module 70, a transmission controller 80, a reception controller 90, a state managing module 100, a transmission timing managing module 110, a sleep controller 120, a connection managing module 130, and a network interface (hereinafter abbreviated as N/I) 140. The transmission processor 40 has a buffer 41. The transmission controller 80 has a first standby time memory 81 and the reception controller 90 has a second standby time memory 91.

The access point AP1 performs a wireless communication by means of the antenna module 10. The access point AP1 performs a communication over the network by means of the N/I 140.

The state managing module 100 is rendered in a transmission state, a reception state, a standby state, or a sleep state. The state managing module 100 controls the transmission controller 80 or the reception controller 90 and other modules depending on its own state.

When the access point AP1 sends a wireless signal, the state managing module 100 is rendered in the transmission state and controls the transmission controller 80 and other modules to perform transmission processing. Upon completion of the transmission processing, the state managing module 100 makes a transition to the standby state.

When the access point AP1 receives a wireless signal, the state managing module 100 is rendered in the reception state and controls the reception controller 90 and other modules to perform reception processing. Upon completion of the reception processing, the state managing module 100 makes a transition to the standby state.

When the access point AP1 does not receive a wireless signal from a wireless terminal and the power consumption should be suppressed, the state managing module 100 controls the sleep controller 120 and other modules and is rendered in the sleep state. While the state managing module 100 is in the sleep state, the sleep controller 120 suspends the supply of power to the receiving module 30, the carrier sense determining module 60, the reception analyzing module 70, and the reception controller 90. If the sleep controller 120 informs the state managing module 100 of cancellation of the sleep state, the state managing module 100 makes a transition to the standby state.

While the access point AP1 maintains a state that it can receive a wireless signal from a wireless terminal, the state managing module 100 is rendered in the standby state and controls the reception controller 90 and other modules to perform a standby receiving operation. If reception of a wireless signal is started during a standby receiving operation, the state managing module 100 makes a transition to the reception state. If a wireless signal transmission request occurs during a standby receiving operation, the state managing module 100 makes a transition to the reception state. If a transition-to-sleep-mode request occurs during a standby receiving operation, the state managing module 100 makes a transition to the sleep state.

First, an operation that the access point AP1 transfers a data signal received over the network to a wireless terminal will be described.

The N/I 140 receives, over the network, a data signal that is sent from the communication apparatus F. The data signal received by the N/I 140 is output to the transmission processor 40. The transmission processor 40 has the buffer 41 for storing a data signal temporarily. The buffer 41 thus stores the data signal received by the N/I 140. The transmission processor 40 converts the data signal stored in the buffer 41 into wireless transmission frames, and outputs the frames to the transmitting module 20. The transmitting module 20 converts the frames into a wireless signal by performing analog processing such as D/A conversion. The transmitting module 20 sends the wireless signal via the antenna module 10.

The transmission controller 80 controls the processing that the transmission processor 40 sends the data signal stored in the buffer 41. The transmission controller 80 can recognize the amount of data stored in the buffer 41. Upon recognizing that data is stored in the buffer 41, the transmission controller 80 inquires of the state managing module 100 whether transmission of a wireless signal is possible.

If the receiving module 30 is receiving a wireless signal, the state managing module 100 determines that transmission of a wireless signal is impossible. If the receiving module 30 is receiving no wireless signal and the access point AP1 is in a standby reception state, the state managing module 100 determines that transmission of a wireless signal is possible.

If transmission of a wireless signal is possible, the transmission controller 80 causes the carrier sense determining module 60 to perform carrier sensing for a certain time and controls the transmission processor 40 to cause it to perform transmission processing according to a result of the carrier sensing.

Next, an operation that the access point AP1 transfers a wireless signal received from a wireless terminal to the network will be described.

The antenna module 10 receives a wireless signal from a wireless terminal. The receiving module 30 performs analog processing such as frequency conversion processing and A/D conversion on the wireless signal received by the antenna module 10 and thereby converts it into frames (digital data). The receiving module 30 outputs the frames to the reception analyzing module 70.

The reception analyzing module 70 analyzes a destination address etc. of the frames. If the destination address of the frames is the communication apparatus F, the reception analyzing module 70 outputs the frames to the N/I 140. The N/I 140 transfers the frames to the communication apparatus F over the network.

If the analyzed frame is a connection request signal, the reception analyzing module 70 determines whether connection is possible and outputs a determination result to the connection managing module 130. The connection managing module 130 stores pieces of identification information of wireless terminals that can currently communicate with the access point AP1 (i.e., in a connection state) and the number of wireless terminals that can currently communicate with the access point AP1 (e.g., the number of associated terminals).

Next, an operation that the access point AP1 sends a notification signal will be described.

The access point AP1 sends, via the antenna module 10, a notification signal which contains identification information of the access point AP1 (e.g., a MAC address of the access point AP1).

The transmission controller 80 has the first standby time memory 81, which stores the length of a period (first standby period) when the access point AP1 is rendered in a standby state before transmission of a notification signal.

The reception controller 90 has the second standby period memory 91, which stores the length of a period (second standby period) when the access point AP1 is rendered in a standby state after transmission of a notification signal.

Having a timer or the like, the transmission timing managing module 10 informs the transmission controller 80 of transmission timing of a notification signal. The transmission interval of notification signals may be either fixed or variable.

The transmission controller 80 inquires of the state managing module 100 whether transmission of a wireless signal (notification signal) is possible. If transmission of a wireless signal is possible, the transmission controller 80 performs carrier sensing. Since the wireless LAN employs CSMA which is a distribution control type access scheme, the access point AP1 needs to perform carrier sensing also before transmission of a notification signal.

The transmission controller 80 causes the carrier sense determining module 60 to perform carrier sensing in advance, that is, before transmission timing of a notification signal. Before transmission of a notification signal, the carrier sense determining module 60 observes for a certain time straight whether a wireless channel to be used for transmission of the notification signal is being used by a wireless terminal.

The length of a period when carrier sensing is performed (hereinafter referred to as a carrier sense period) may be a time (25 μs) that is defined as PIFS in IEEE 802.11 or the sum of a time (34 μs) that is defined as DIFS and a back-off time (an integer multiple of 9 μs). If the wireless channel is not used by a wireless terminal, the first standby time becomes approximately equal to the time length of carrier sensing that is performed before transmission of a notification signal.

If the wireless channel has not been used by a wireless terminal throughout the carrier sense period, the carrier sense determining module 60 makes a determination "idle." If the wireless channel was used by a wireless terminal even once in the carrier sense period, the carrier sense determining module 60 makes a determination "busy." The carrier sense determining module 60 outputs a carrier sense result (busy or idle) to the transmission controller 80.

If the carrier sense result is "idle," the transmission controller 80 controls the notification signal generating module 50 to cause it to generate a notification signal. The notification signal generating module 50 outputs the generated notification signal to the transmitting module 20. The transmitting module 20 performing analog processing etc. on the notification signal and sends out a resulting signal via the antenna module 10.

Although in the above description the notification signal generating module 50 generates a notification signal under the control of the transmission controller 80, the notification signal generating module 50 may generate a notification signal in advance without being controlled by the transmission controller 80.

Next, a description will be made of a wireless signal that is received by the access point AP1 in a case that as shown in FIG. 2 no wireless terminal exists in the communication area of the access point API and no wireless terminal is connected to the access point AP1.

Since no wireless terminal exists in the communication area of the access point AP1, there is a probability that the access point AP1 receives a connection request signal from a wireless terminal that newly enters the communication area.

A wireless terminal sends a connection request signal to the access point AP1 with such timing that the wireless terminal recognizes that it exists in the communication area of the access point AP1 and synchronization has been established with the access point AP1.

The wireless terminal recognizes that it exists in the communication area of the access point AP1 by receiving a notification signal from the access point AP1. The wireless terminal establishes synchronization with the access point AP1 using a time stamp that is contained in the notification signal.

The wireless terminal sends a connection request signal to the access point AP1 according to the notification signal received from the access point AP1. That is, the timing with which the wireless terminal sends the connection request signal is closely related to the timing with which the access point AP1 sends the notification signal.

Next, a description will be made of the timing with which the access point AP1 makes a transition to a sleep state according to the number of wireless terminals connected and the transmission timing of a notification signal as well as of the period of the sleep state.

Figure 4A:
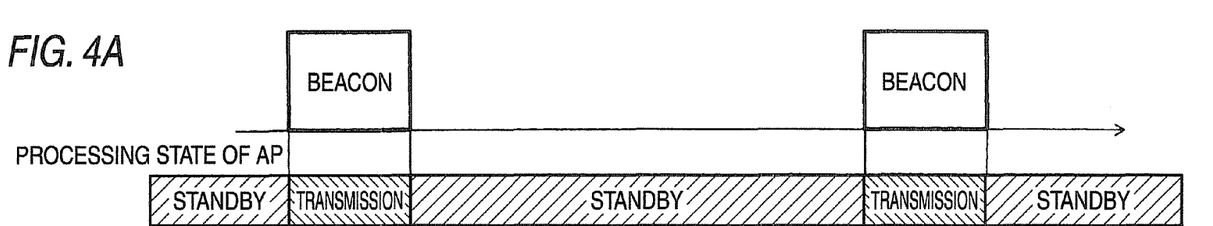
FIGS. 4A to 4C illustrate exemplary operations of the access point according to the first embodiment of the invention.

FIG. 4A shows how the access point AP1 operates when there exists a wireless terminal being connected to the access point AP1. The connection managing module 130 is stored with information that the number of wireless terminals being connected to the access point AP1 is one or more (or there exists a wireless terminal(s) being connected to the access point AP1).

The state managing module 100 is rendered in the transmission state only during notification signal transmission periods. The state managing module 100 is rendered in the standby state during periods other than the notification signal transmission periods. Unless receiving a wireless signal, the access point AP1 (state managing module 100) is repeatedly rendered in the transmission state and the standby state.

Figure 4B:
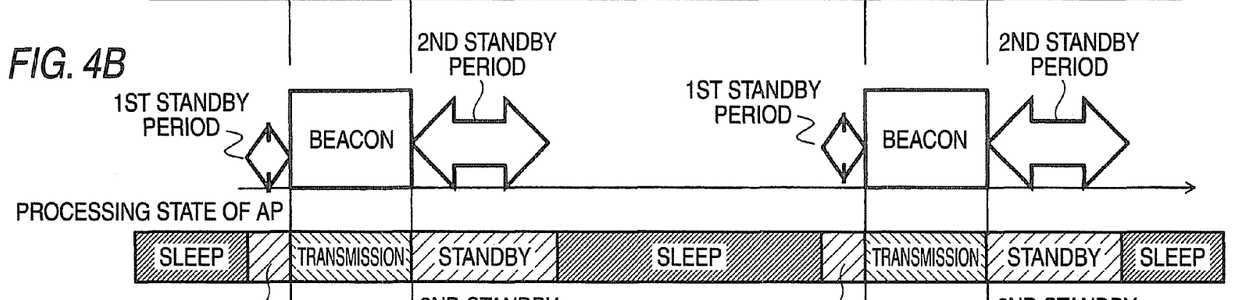
Figure 4C:
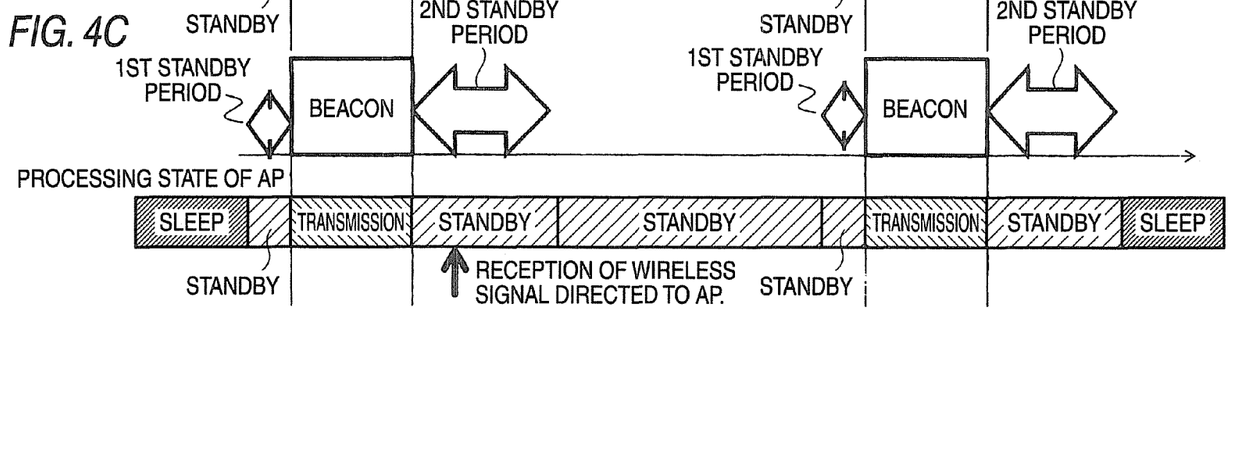

FIGS. 4B and 4C show how the access point AP1 operates when there exists no wireless terminal being connected to the access point AP1. The connection managing module 130 is stored with information that the number of wireless terminals being connected to the access point AP1 is zero (or there exists no wireless terminal being connected to the access point AP1).

The state managing module 100 is rendered in the standby state in the first standby period before notification signal transmission timing. In the first standby period, the carrier sense determining module 60 performs carrier sensing under the control of the transmission controller 80. The state managing module 100 makes a transition to from the sleep state to the standby state with timing that is earlier than the notification signal transmission timing by the first standby time.

If the result of the carrier sensing performed in the first standby period is "idle," the state managing module 100 is rendered in the transmission state during the notification signal transmission period. The notification signal generating module 50 generates a notification signal and performs processing of transmitting it under the control of the transmission controller 80.

Upon completion of the notification signal transmission processing, the state managing module 100 is rendered in the standby state during the second standby period. During the second standby period, the carrier sense determining module 60 performs carrier sensing under the control of the reception controller 90.

If a wireless signal is not received from a wireless terminal in the second standby period (see FIG. 4B), the state managing module 100 is rendered in the sleep state upon a lapse of the second standby period. The reception controller 90 requests the state managing module 100 to make a transition to the sleep state. The state managing module 10 makes a transition to the sleep state and the sleep controller 120 suspends prescribed supply of power.

The length of the sleep period relates to transmission timing of the next notification signal. The transmission timing managing module 110 instructs the sleep controller 120 to cancel the sleep state when the value of the timer of the transmission timing managing module 110 has become smaller than or equal to a threshold value. The sleep controller 120 cancels the suspension of the prescribed supply of power and the state managing module 100 makes a transition to the standby state.

Another configuration is possible in which the state managing module 100 is equipped with a timer and makes a transition from the sleep state to the standby state based on the notification signal transmission timing. In this case, the sleep controller 120 cancels the suspension of the prescribed supply of power in response to a sleep state cancellation notice that is supplied from the state managing module 100.

On the other hand, if a wireless signal is received from a wireless terminal in the second standby period (see FIG. 4C), the state managing module 100 maintains the standby state even after a lapse of the second standby period. The state managing module 100 can maintain the standby state only if a wireless signal (connection request signal) that is directed to the access point AP1 is received in the second standby period.

The first standby period is a period of carrier sensing that is performed before the access point AP1 sends a notification signal. The length of the first standby period may be equal to a maximum carrier sense time or a time that is longer than the maximum carrier sense time by a certain time.

The second standby time is the sum of a time of carrier sensing that is performed before a wireless terminal sends a connection request signal and a time taken by the wireless terminal to send the connection request signal to the access point AP1.

The time of carrier sensing that is performed before a wireless terminal sends a connection request signal may be a maximum carrier sense time. For example, where the carrier sense time varies depending on the back-off value, a carrier sense time may be calculated as the maximum value (contention window) of back-off values occurring at the time of transmission of a connection request signal.

The time that is taken by a wireless terminal to send a connection request signal to the access point AP1 (i.e., the time length of the connection request signal) is derived from a size and a transmission rate of the connection request signal. The size of a connection request signal may be fixed and the transmission rate of a connection request signal may be a lowest one assumed in the system. For example, in the case of IEEE 802.11a, the time length of a connection request signal may be derived with an assumption that it is transmitted at 6 Mbps.

The second standby time may be a value obtained by adding a time taken by a wireless terminal to determine whether to send a connection request signal to the sum of the time of carrier sensing that is performed before the wireless terminal sends a connection request signal and the time taken by the wireless terminal to send the connection request signal to the access point AP1.

The time taken by a wireless terminal to determine whether to send a connection request signal may be a value that was determined empirically in advance, a value that is obtained from database values that were determined empirically for respective wireless terminal types, or a proper value that is derived from the contents of registration of certain wireless terminal types that were registered in advance as ones that may be connected to the access point AP1 (e.g., the maximum value of values of the registered wireless terminal types).

The second standby time may be the maximum value of times taken by the access point AP1 in the past until reception of a connection request signal as measured from a time point of transmission of a notification signal. Or the second standby time may be the maximum value of times that were taken by the access point AP1 in the past until reception of a connection request signal as measured from a time point of transmission of a notification signal and that are shorter than or equal to a threshold time.

Every time the second standby time is updated, the access point AP1 may inform the other access points belonging to the same subnet (given the same network address) of the new second standby time so that the second standby time is updated to a proper value in real time in all the access points in the subnet.

As described above, the second standby time is set longer than or equal to a time taken until a wireless terminal sends a connection request signal to the access point AP1 as measured from a time point of reception of a notification signal.

However, where another network exists near the access point AP1 or a wireless terminal, there may occur an event that a wireless channel is determined "busy" because of a wireless signal sent from a wireless apparatus belonging to that network and connection request frames cannot be received for a long time.

If a wireless signal that is not directed to the access point AP1 is received in the second standby period, the reception controller 90 extends the second standby period. The reception controller 90 determines the time by which the second standby period should be extended according to the wireless signal that is received in the second standby period and is not directed to the access point AP1.

If the time length of the wireless signal is T, the reception controller 90 extends the second standby period by T. If the wireless signal contains information for virtual carrier sensing such as an NAV (network allocation vector), the reception controller 90 extends the second standby period by a time that includes an NAV setting time (i.e., the value of a duration field).

For example, if the signal length of the wireless signal is Td and a time Ta is set as an NAV value that is necessary for receiving an Ack signal as a reply from a transmission destination, the reception controller 90 extends the second standby period by Td+Ta.

The reception controller 90 extends the second standby period based on a busy time T that is obtained as a result of physical carrier sensing or a busy time Td+Ta that is obtained as a result of both of physical carrier sensing and virtual carrier sensing.

This allows the access point AT1 to receive a connection request signal from a wireless terminal even in the case where the wireless channel utilization rate is high.

All of the above-mentioned carrier sense time, back-off time, and signal length of a connection request signal are several microseconds to tens of microseconds.

A wireless terminal may take a long time to send a connection request signal because it has received plural notification signals to determine an access point to connect to. However, since a wireless terminal sends a connection request signal after establishing synchronization with an access point using a notification signal, the time taken until the wireless terminal sends the connection request to the access point as measured from reception of the notification signal is several microseconds to tens of microseconds, which is very much shorter than the interval (cycle) of notification signal transmissions.

Therefore, where the access point AP1 has no wireless terminal connected and does not receive a wireless signal in the second standby period, the time for which the access point AP1 is in the sleep state is much longer than the standby time (i.e., the sum of the first standby time and the second standby time).

The power consumption reducing effect is further increased by elongating the notification signal transmission interval (cycle).

As described above, in the access point AP1 according to the first embodiment, if there is no wireless terminal connected to it, a sleep state is established according to notification signal transmission timing. As a result, even where a wireless signal is sent from a terminal according to CSMA/CA, the access point AP1 does not fail to receive a connection request signal and the power consumption can be reduced greatly.

In the first embodiment, it is assumed that the access point AP1 receives a connection request signal from a wireless terminal as a signal for requesting a new connection.

However, the signal that a wireless terminal sends to the access point AP1 to connect to it may be an authentication request signal. In this case, the access point AP1 (state managing module 100) determines whether to make a transition to the sleep state based on whether the authentication request signal is received in the second standby period.

(Second Embodiment)

The first embodiment assumes the situation that there is no wireless terminal that is connected to the access point AP1. In contrast, the second embodiment assumes a situation that a small number of wireless terminals are connected to an access point AP1'.

The wireless LAN standard prescribes that in disconnecting a communication a wireless terminal or an access point should send a disconnection request signal (deauthenticate frame). However, there may occur a case that a communication is disabled because the wireless communication environment is deteriorated before sending of a disconnection request signal. Furthermore, a wireless LAN application that is installed in a notebook personal computer, for example, may not perform wireless LAN disconnection processing due to, for example, forced shutdown of the notebook personal computer.

As a result, the wireless LAN access point may continue to manage the wireless terminal that is no longer connected to it.

The access point AP1' according to the second embodiment can reduce the power consumption even in such a situation.

Figure 5:
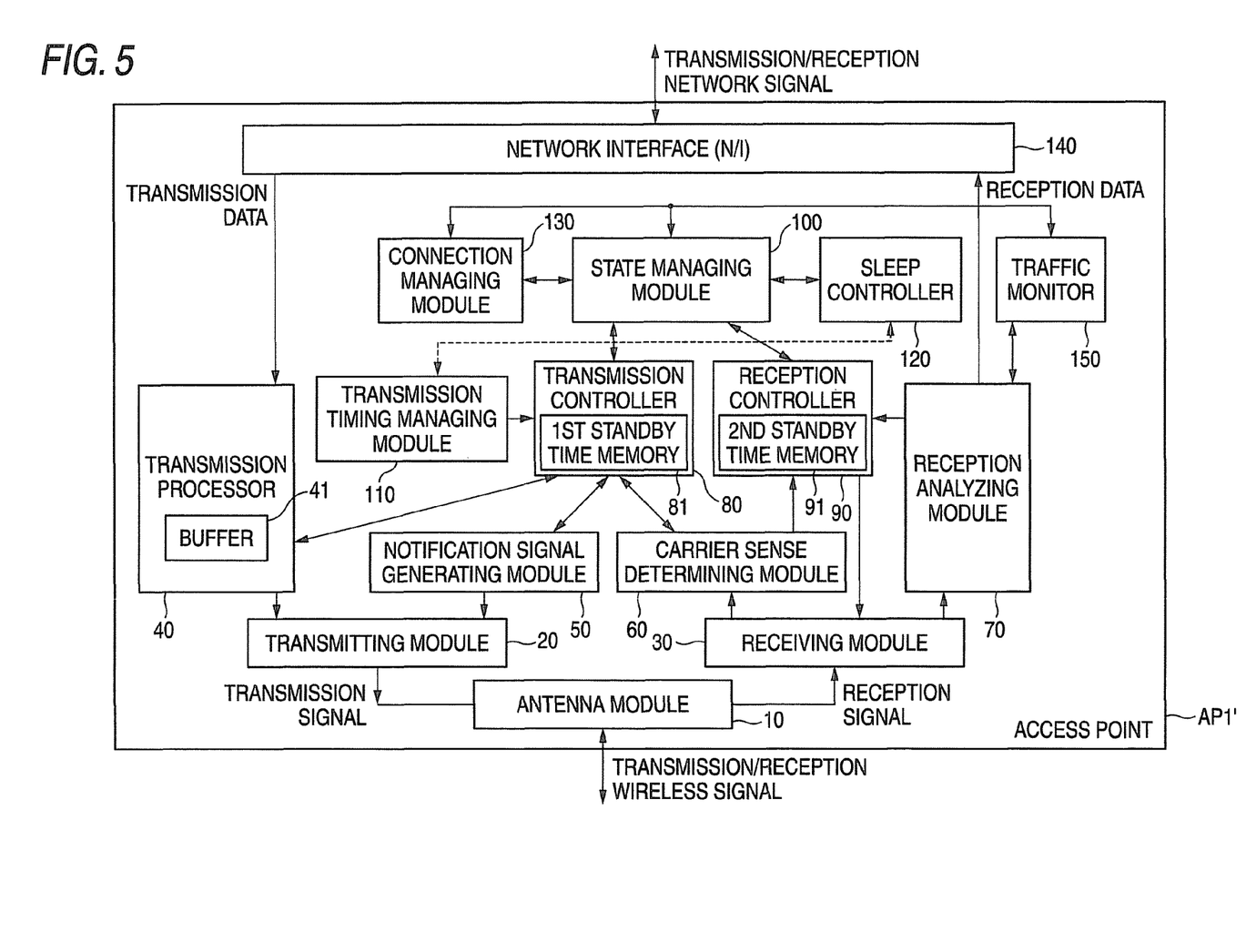
FIG. 5 is an exemplary block diagram showing a configuration of an access point according to a second embodiment of the invention.

FIG. 5 is a block diagram showing the configuration of the access point AP1' according to the second embodiment.

The access point AP1' according to the second embodiment is different from the access point AP1 according to the first embodiment in that the former is further equipped with a traffic monitor 150 for observing the reception state of a signal that is transmitted from a wireless terminal connected.

Further, a traffic monitor may be provided which observes the transmission state of a signal that is sent from the access point AP1' to a wireless terminal connected.

The traffic monitor 150 observes the reception state of a signal that is transmitted from a wireless terminal connected to the access point AP1' after transmission of a notification signal.

If no wireless signal is transmitted from a wireless terminal connected to the access point AP1' during a period between adjoining notification signal transmissions, the connection managing module 130 determines that the wireless terminal has been disconnected.

If no wireless signal is received in the second standby period after transmission of the next notification signal, the access point AP1' (state managing module 100) makes a transition to the sleep state as in the case that there is no wireless terminal connected. This makes it possible to prevent wasteful power consumption even in the case where there exists a wireless terminal that is erroneously determined as being connected to the access point AP1'.

In the above description, the connection managing module 130 determines that a wireless terminal has been disconnected if a situation that no wireless signal is transmitted from the wireless terminal to the access point AP1' during a period between adjoining notification signal transmissions occurs even once.

Alternatively, the connection managing module 130 may determine that a wireless terminal has been disconnected if a situation that no wireless signal is transmitted from the wireless terminal to the access point AP1' during a period between adjoining notification signal transmissions has occurred a threshold number of times consecutively. This prevents erroneous disconnection of a wireless terminal.

A common procedure that is followed when a wireless terminal is disconnected from the access point AP1' is to send a disconnection request signal or the like and perform disconnection processing. However, as described above, it is not always necessary to send a disconnection request signal even if the connection managing module 130 determines that the wireless terminal has been disconnected.

This is because a wireless LAN application installed in a notebook personal computer, for example, may not send a wireless signal even if the notebook personal computer is connected to the access point AP1' when the user has suspended operation of the notebook personal computer or the user is performing processing that does not use the wireless LAN application.

Refraining from performing disconnection processing allows a wireless terminal to restart a communication without the need for performing connection processing again.

(Modifications)

In the above description, the access point AP1' makes a transition to the sleep state without checking a state of the wireless terminal accurately.

As a result, the access point AP1' may be in the sleep state when the user restarts a wireless communication after not using the wireless LAN application (wireless terminal) temporarily. In this case, the wireless terminal cannot communicate with the access point AP1' until the access point AP1' makes a transition from the sleep state to the standby state, and is obliged to repeatedly perform processing of re-sending a wireless signal.

To prevent such a situation, the access point AP1' according to a modification of the second embodiment sends, before making a transition to the sleep state, a signal (sleep request signal) containing additional information indicating that the access point AP1' is making a transition to the sleep state. In the access point AP1', a sleep response time (described later) and the second standby time may be either set at predetermined values or set dynamically. The above additional information contained in the sleep request signal may be added to a notification signal, which is sent as a sleep request signal. Information relating to the sleep time of the access point AP1' may either be contained in or not be contained in the sleep request signal.

Figure 6:
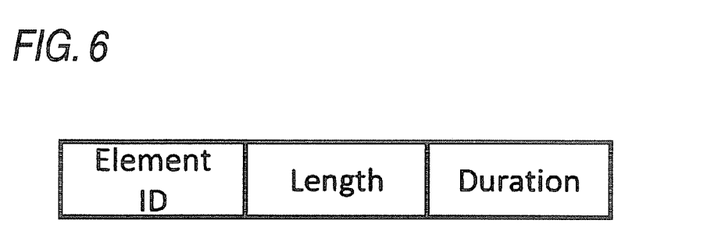
FIG. 6 shows an exemplary format of a sleep request signal.

FIG. 6 shows an example format of the sleep request signal.

The sleep request signal includes an element ID field, a length field, and a duration field. The element ID field contains an identifier indicating whether the value of the duration filed is a sleep response time or a second standby time. The value of the length field indicates the length of the duration field. The length field may be omitted in the case where the length of the duration field is fixed. A sleep response time or a second standby time is written in the duration field depending on the value of the element ID field.

A time length may be represented by a multiple of a predetermined unit (e.g., 1 μs or 10 μs). Where the predetermined unit is 10 μs and the sleep response time is 50 μs, a value "5" is set in the duration field.

Where information relating to the sleep time of the access point AP1' is added to a sleep request signal, the access point AP1' sets a value based on the transmission timing of the sleep request signal. This makes it possible to set a sleep time flexibly though the processing load of the access point AP1' is increased.

An alternative design is that no information relating to the sleep time of the access point AP1' is added to a sleep request signal and the sleep period is set so as to end at the transmission timing of the next notification signal. This makes it possible to reduce the processing load of the access point AP1'.

Next, a description will be made of how a wireless terminal operates when receiving a sleep request signal from the access point AP1'. The sleep request signal contains a time (sleep response time) taken by the wireless terminal to send a reply to the effect that it does not want the access point AP1' to make a transition to the sleep state.

The access point AP1' can set the sleep response time at an arbitrary time. For example, where a notification signal is sent as a sleep request signal, the access point AP1' can set the sleep response period so that it ends together with the second standby period.

When receiving a sleep request signal, the wireless terminal does not respond if it accepts the transition-to-sleep-state request of the access point AP1'.

On the other hand, when receiving a sleep request signal, the wireless terminal returns a signal for refusing the transition to the sleep state to the access point AP1' in the sleep response period.

If receiving a wireless signal directed to itself from at least one wireless terminal in the sleep response period, the access point AP1' continues the standby receiving operation without making a transition to the sleep state even after the second standby period.

The signal for refusing the transition to the sleep state may be a signal dedicated to that purpose, a signal in which information indicating refusal to accept the transition to the sleep state is added to a header, for example, of an ordinary data frame, or a signal that is an ordinary data frame or the like.

Where the signal for refusing the transition to the sleep state is allowed to be a signal that is an ordinary data frame or the like, it should be defined in advance in protocol form that sending a signal to the access point AP1' in a sleep response period means refusal to accept a transition of the access point AP1' to the sleep state.

Where the wireless terminal sends a data frame or the like to the access point AP1' in the sleep response period, information indicating whether the wireless terminal holds data to be sent successively is added to that data frame or the like.

The reception analyzing module 70 of the access point AP1' analyzes the received wireless signal and determines whether the wireless terminal holds data to be sent successively.

If the reception analyzing module 70 determines that the wireless terminal does not hold data to be sent successively, the state managing module 100 makes a transition to the sleep state after a lapse of the second standby period.

On the other hand, the reception analyzing module 70 determines that at least one wireless terminal holds data to be sent successively, the state managing module 100 does not make a transition to the sleep state, that is, maintains the standby state.

When receiving plural wireless signals from the same wireless terminal in the second standby period, the access point AP1' determines whether to make a transition to the sleep state based on the information (indicating whether the wireless terminal holds data to be sent successively) that is contained in the last-received wireless signal.

Where the access point AP1' continues the standby state even after the second standby period, the access point AP1' stores the pieces of information (indicating whether the respective wireless terminals hold data to be sent successively) for the respective wireless terminals.

If, as the access point AP1' continues to communicate with the wireless terminals, the access point AP1' receives information to the effect that no data to be sent successively is held from all the wireless terminals that previously sent the information to the effect that data to be sent successively was held, the access point AP1' makes a transition to the sleep state and will maintain the sleep state until transmission timing of the next notification signal.

The above procedure prevents the access point AP1' from being rendered in the standby state uselessly and can thereby reduce the power consumption.

The wireless terminal that sent the wireless signal containing the information to the effect that no data to be sent successively is held should refrain from sending a wireless signal until it receives the next notification signal and determines that the access point AP1' has made a transition to the standby state.

The second standby time is determined according to the number of wireless terminals connected to the access point AP1': the second standby time is set longer as the number of wireless terminals connected to the access point AP1' increases.

For example, when data of 1,500 bytes is transmitted at a rate of 54 Mbps, hundreds of microseconds are taken to communicate that data. If only one wireless terminal is connected to the access point AP1', the second standby time may be set long enough to allow one wireless terminal to send at least one data: about 1 millisecond is sufficient even if a CSMA back-off time is taken into consideration.

However, if plural wireless terminals are connected to the access point AP1', it is necessary to receive, in the second standby period, data (e.g., a signal for refusing the transition to the sleep state) that is transmitted from each wireless terminal. To this end, the second standby time is set so as to increase monotonously with the number of wireless terminals connected to the access point AP1'.

(Third Embodiment)

In the first and second embodiments, the access point AP1 or AP1' makes a transition to the sleep state according to the connection state or the traffic state of a wireless terminal. A third embodiment is directed to a method for reducing the power consumption of the access point AP1 more positively.

An access point AP1 according to the third embodiment performs the same intermittent receiving operation as the access points AP1 and AP1' according to the first and second embodiments do irrespective of the connection state or the traffic state of a wireless terminal.

Irrespective of the connection state or the traffic state of a wireless terminal, the access point AP1 according to the third embodiment sends out notification signals regularly. The access point AP1 makes a transition to the sleep state after a lapse of a second standby time from transmission of a notification signal and then makes a transition to the standby state a first standby time before transmission timing of the next notification signal.

The access point AP1 adds, to a notification signal, information relating to a time (third standby time) upon the passage of which from transmission of the notification signal a transition will be made to the standby state. The access point AP1 makes a transition to the sleep state if the third standby time elapses from the transmission of the notification signal without receiving a wireless signal directed to itself.

On the other hand, the access point AP1 does not make a transition to the sleep state even after the third standby period if it receives a wireless signal directed to itself before the third standby time elapses from the transmission of the notification signal.

To communicate with the access point AP1, a wireless terminal sends a frame directed to the access point AP1 by the time when the third standby time written in a notification signal elapses from reception of the notification signal.

The third standby period can also be expressed as a period when the access point AP1 allows wireless terminals to send a signal.

(Modifications)

If no request for sending a wireless signal to a certain wireless terminal occurs in the third standby period or the access point AP1 receives no wireless signal directed to itself from a certain wireless terminal in the third standby period, the access point AP1 refrains from sending a wireless signal to that wireless terminal after a lapse of the third standby period.

In other words, if the access point AP1 is to send a wireless signal to a certain wireless terminal after a lapse of the third standby period, it is necessary for the access point AP1 to send a wireless signal to that wireless terminal in the third standby period or to receive a wireless signal directed to itself from that wireless terminal in the third standby period.

This restriction allows the access point AP1 and a wireless terminal to make transitions to the sleep state in a synchronized manner. That is, a wireless terminal that did not communicate with the access point AP1 in the third standby period can make a transition to the sleep state after a lapse of the third standby period. This is effective in reducing the power consumptions of wireless terminals.

Adding, as described in the second embodiment, information indicating whether data to be sent successively is held to a wireless signal that is sent from the access point AP1 or a wireless terminal makes it possible to clearly recognize whether the communication continues even after the third standby period.

Even if the access point AP1 and a wireless terminal communicated with each other in the third standby period, they make transitions to the sleep mode in a synchronized manner after a lapse of the third standby period as long as no data to be sent successively is held.

(Fourth Embodiment)

An access point AP1 according to a fourth embodiment sends out notification signals regularly and makes transitions between the sleep state and the standby state repeatedly according to any of the methods described in the first to third embodiments.

The access point AP1 increases the transmission cycle of notification signals if a situation that it receives no transmission signal between notification signal transmissions has occurred a threshold number of times consecutively.

The access point AP1 increases the transmission cycle of notification signals determining that no wireless terminal exists currently that intends to connect to the access point AP1 (i.e., the wireless LAN is not used currently). Or the access point AP1 increases the transmission cycle of notification signals determining that there is almost no traffic (i.e., there is almost no communication) involving wireless terminals connected to the access point AP1.

Increasing the transmission cycle of notification signals as described above can be applied to any of the access points AP1 and AP1' according to the first to third embodiments. The above-mentioned threshold numbers of times are not necessarily the same.

In the access point AP1 according to the first or third embodiment, even if the transmission cycle of notification signals is increased, it is not necessary to increase the second standby period because there is no interdependence between the transmission cycle of notification signals and the timing with which a wireless terminal sends a connection request signal after receiving a notification signal. Therefore, increasing the transmission cycle of notification signals can increase the ratio of the sleep time to the standby time and hence reduce the power consumption further.

In the access point AP1' according to the second embodiment, there is a low degree of interdependence between the transmission cycle of notification signals and the timing with which a wireless terminal sends a connection request signal after receiving a notification signal. However, since the access point AP1' sets the second standby time taking the traffic state of a wireless terminal and other factors into consideration, increasing the transmission cycle of notification signals by a factor of N does not require increasing the second standby time by the same factor. Therefore, increasing the transmission cycle of notification signals can increase the ratio of the sleep time to the standby time and hence reduce the power consumption further.

(Fifth Embodiment)

As shown in FIG. 1, in many cases, a wireless LAN access point is used being connected to a network and hence has a router function or a bridge function.

If a situation that the access point AP1 receives no transmission signal between notification signal transmissions has occurred a threshold number of times consecutively, the access point AP1 can determine that there is no wireless terminal connected or no traffic occurs even if there is a wireless terminal connected. Therefore, in such a situation, the access point AP1 suspends the router function or the bridge function and suspends the supply of power to a unit that performs the router function or the bridge function.

The router function is a routing function of determining a signal transfer destination based on an IP address which indicates a signal destination. The bridge function is a function of determining a signal transfer destination based on a MAC address which indicates a signal destination.

If receiving a wireless signal directed to itself in the second standby period (or the third standby period), the access point AP1 determines that a communication with the wireless terminal has been restarted and cancels the suspension of the supply of power to the unit that performs the router function or the bridge function. In this manner, the power consumption of the access point AP1 can be reduced without lowering its functionality or performance.

Figure 7:
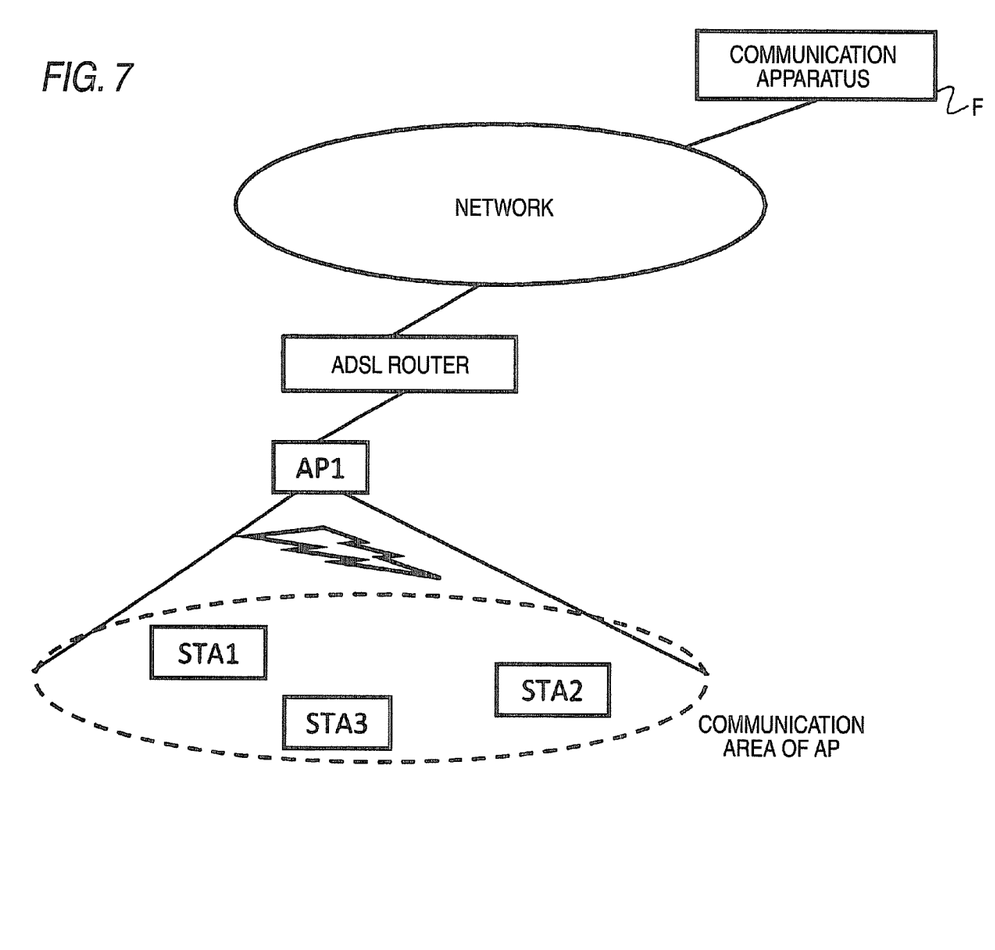
FIG. 7 is an exemplary block diagram showing a configuration of a communication system according to a fifth embodiment of the invention.

FIG. 7 is a block diagram showing an example configuration of a network.

As shown in FIG. 7, in many cases, the access point AP1 is used being connected to a network; for example, in many cases, it is connected to an ADSL router via a LAN line or connected to a switch or a router.

Figure 8:
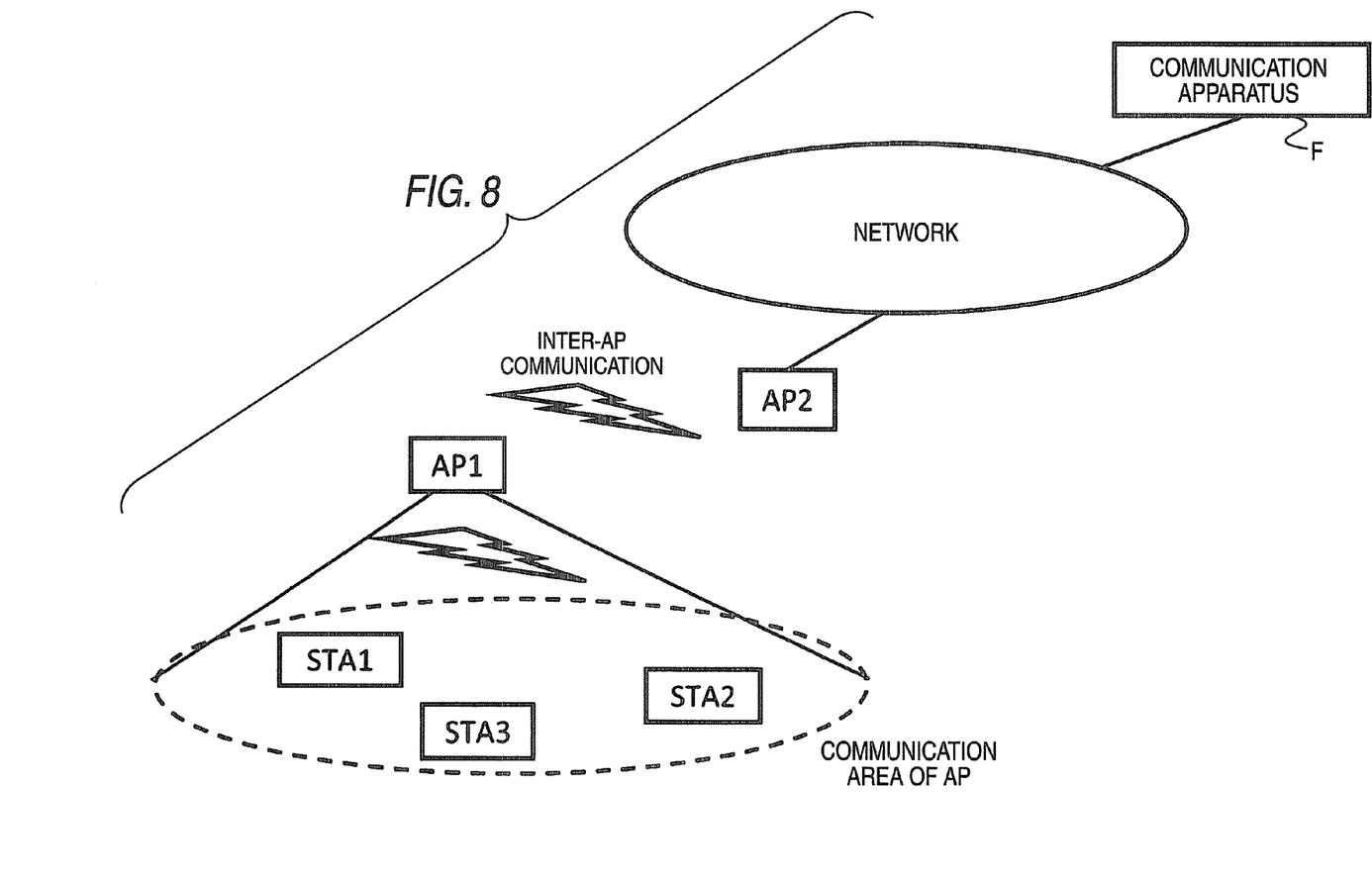
FIG. 8 is an exemplary block diagram showing a configuration of another communication system according to the fifth embodiment of the invention.

FIG. 8 is a block diagram showing another example configuration of a network.

As shown in FIG. 8, the access point AP1 may be connected to another access point AP2 by using inter-access-point communication that is standardized in the wireless LAN.

As described above, the access point AP1 may be connected to a communication apparatus F via a wired line or a wireless line and thus serve as part of a network. However, if a situation that the access point AP1 receives no transmission signal between notification signal transmissions has occurred a threshold number of times consecutively and the access point AP1 is suspending a router function or a bridge function, it is meaningless for the access point AP1 to connect to the communication apparatus F.

Therefore, the access point AP1 disconnects a communication channel on which a communication is performed with the communication apparatus F via a wired line or a wireless line.

In disconnecting a communication with the communication apparatus F via a wired line, the access point AP1 suspends the supply of power to the N/I 140. In disconnecting a communication with the other access point AP2 via a wireless line, the access point AP1 sends a disconnection request signal to the access point AP2.

This makes it possible to save the power consumption that is otherwise necessary for the communication with the communication apparatus F. Reduction in power consumption can also be expected in the communication apparatus F by disconnecting the unnecessary communication with the access point AP1.

If receiving a wireless signal directed to itself in the second standby period (or third standby period), the access point AP1 determines that a communication with a wireless terminal has been restarted and restarts a communication with the communication apparatus F to function as part of the network again.

In the above-described manner, the power consumption of the access point AP1 can be reduced without lowering its functionality or performance.

(Sixth Embodiment)

The IEEE 802.11 wireless LAN standard defines a passive scan mode and an active scan mode as two modes in which a wireless terminal searches for an access point.

A wireless terminal that is set to the passive scan mode recognizes the presence of an access point by receiving a notification signal that is transmitted from the access point.

A wireless terminal that is set to the active scan mode sends a search request signal (probe request) for searching for an access point. When receiving the search request signal, an access point returns a search response signal (probe response) to the wireless terminal. The wireless terminal recognizes the presence of the access point by receiving the search response signal.

In the passive scan mode, the time taken by a wireless terminal to search for an access point depends on the transmission interval of notification signals that are sent from the access point. The worst case is that a passive scan is started immediately after an access point sent a notification signal. In this case, a wireless terminal receives a notification signal only after waiting for it for a time that is close to the transmission cycle of notification signals.

In the active scan mode, a wireless terminal can send a search request signal immediately after starting a search for an access point. The time to search for an access point can thus be shortened.

However, for an access point to be able to return a search response signal quickly when receiving a search request signal, it is necessary that the access point be rendered in the standby state all the time so as to be able to always receive a search request signal from a wireless terminal.

In view of the above, an access point AP1 according to a sixth embodiment is configured so as to be able to use plural wireless channels and to manage, in a discriminated manner, wireless channels that accommodate the passive scan mode and ones that accommodate the active scan mode. The access point AP1 according to the sixth embodiment and each wireless terminal have a management method of wireless channels in common.

Specifically, where the access point AP1 manages wireless channel-1 to wireless channel-3, it is determined in advance that wireless channel-1 is for the active scan mode and wireless channel-2 and wireless channel-3 are for the passive scan mode.

Among methods for determining a wireless channel to be used by the access point AP1 is a method that the user determines a wireless channel to be used when activating the access point AP1 and a method that the access point AP1 dynamically determines a wireless channel to be used by observing the use states of the respective wireless channels.

In the former method, if the user wants to cause the access point AP1 to operate in a low power mode for as long a time as possible, the user makes a setting that wireless channel-2 or wireless channel-3 is used.

In the latter method, the user makes, in advance, a setting as to whether he or she wants an operation in the low power consumption mode. And the access point AP1 determines, as a wireless channel to be used, one having a lowest use frequency by observing the use states of the respective wireless channels.

If the user makes a setting that he or she wants an operation in the low power consumption mode, the access point AP1 determines, as a wireless channel to be used, one having a lower use frequency by observing the use states of wireless channel-2 and wireless channel-3.

If the user makes a setting that he or she does not want an operation in the low power consumption mode, the access point AP1 determines, as a wireless channel to be used, one having a lowest use frequency by observing the use states of wireless channel-1, wireless channel-2, and wireless channel-3

Since the access point AP1 and each wireless terminal have the management method of wireless channels in common, each wireless terminal searches for the access point AP1 in the active scan mode when performing a scan on wireless channel-1 and in the passive scan mode, rather than the active scan mode, when performing a scan on wireless channel-2 or wireless channel-3.

In this manner, a scan mode corresponding to each wireless channel is determined in advance. When a wireless channel corresponding to the passive scan mode is used, the access point AP1 makes a transition to the sleep mode in the manner described in any of the first to fifth embodiments.

This makes it possible to reduce the power consumption without failing to receive a search request signal that is sent from a wireless terminal for an active scan.

The invention is not limited to the above embodiments themselves and, in the practice stage, may be embodied in such a manner that constituent elements are modified without departing from the spirit and scope of the invention. And various inventions can be conceived by properly combining plural constituent elements disclosed in each embodiment. For example, several ones of the constituent elements of each embodiment may be omitted. Furthermore, constituent elements of different embodiments may be combined as appropriate.

What is claimed is:

1. A wireless apparatus configured to send notification signals at intervals of a certain period, each notification signal including information for identification of the wireless apparatus, the wireless apparatus comprising:
   a memory configured to store the number of wireless devices that are in such a state as to be able to communicate with the wireless apparatus;
   a determining module configured to determine, before sending the notification signal, whether a wireless channel of the wireless apparatus to be used for sending the notification signal is being used by another wireless device;
   a sending module configured to send the notification signal if the wireless channel has not been used by any other wireless devices throughout a first period;
   a receiving module configured to receive a signal that enables a communication with the wireless apparatus;
   a controller configured to control the receiving module so that a signal transmitted from another wireless device is receivable until a lapse of a second period after transmission of the notification signal; and
   a suspending module configured to suspend supply of power to the receiving module of the wireless apparatus if a signal has not been received from any other wireless devices to the wireless apparatus in the second period and if the number of wireless devices stored in the memory is zero, wherein,
   if the receiving module receives a signal transmitted from another wireless device in the second period, the controller controls the receiving module of the wireless apparatus so that said signal transmitted from said another wireless device is receivable even after a lapse of the second period.

2. The wireless apparatus according to claim 1, wherein a length of the second period includes a time taken to determine whether the wireless channel to be used for sending the notification signal is being used by a wireless device to determine whether a signal can be transmitted from a wireless device and a time taken by a wireless device to send a signal.

3. The wireless apparatus according to claim 1, wherein the suspending module suspends the supply of power to the receiving module for a time that is a transmission interval of notification signals minus a time taken to send a notification signal and lengths of the first period and the second period.

4. The wireless apparatus according to 1, wherein:
   the wireless apparatus further comprises a second memory for storing a difference between a time point when the receiving module receives a signal and a time point when the sending module sent a notification signal immediately before the receiving module receives the signal; and
   a length of the second period is a maximum time among differences between time points when the receiving module receives signals and time points when the sending module sent notification signals immediately before the receiving module receives the signals.

5. The wireless apparatus according to claim 4, wherein when the maximum time among the differences between the time points when the receiving module receives signals and the time points when the sending module sent notification signals immediately before the receiving module receives the signals has been updated, the sending module sends information relating to the updated maximum time to other wireless apparatus having the same network address as the wireless apparatus.

6. The wireless apparatus according to claim 1, wherein, if the receiving module receives a signal that is directed to another wireless apparatus, the controller extends the second period.

7. The wireless apparatus according to claim 6, wherein a time by which the second period is extended is a time taken to receive the signal directed to the other wireless apparatus.

8. The wireless apparatus according to claim 1, wherein a transmission interval of the notification signals is increased if the receiving module does not receive a signal from any wireless devices though the sending module sent the notification signal more than a certain number of times.

9. The wireless apparatus according to claim 1, wherein:
the wireless apparatus further comprises a second determining module configured to determine a transfer destination of a received signal according to a destination address of the received signal; and
the suspending module suspends supply of power to the second determining module in addition to the supply of power to the receiving module if the receiving module does not receive a signal from any wireless devices though the sending module sent the notification signal more than a certain number of times.

10. The wireless apparatus according to claim 9, wherein the suspending module cancels the suspension of the supply of power to the second determining module if the receiving module receives a signal directed to the wireless apparatus while the suspending module is suspending the supply of power to the second determining module.

11. The wireless apparatus according to claim 1, wherein, in a state that the wireless apparatus can communicate with a second wireless apparatus, the sending module sends a signal for terminating the state that the wireless apparatus can communicate with the second wireless apparatus if the receiving module does not receive a signal from any wireless devices though the sending module sent the notification signal more than a certain number of times.

12. The wireless apparatus according to claim 11, wherein the sending module sends the second wireless apparatus a signal for allowing the second wireless apparatus to communicate with the wireless apparatus if the receiving module receives a signal transmitted from a wireless device in the second period.

13. The wireless apparatus according to claim 1, wherein:
the wireless apparatus further comprises an interface configured to communicate with a communication apparatus over a wired line; and
the suspending module suspends supply of power to the interface if the receiving module does not receive a signal from any wireless devices though the sending module sent the notification signal more than a certain number of times.

14. The wireless apparatus according to claim 13, wherein the suspending module cancels the suspension of the supply of power to the interface if the receiving module receives a signal transmitted from a wireless device in the second period.

15. The wireless apparatus according to claim 1, wherein:
the wireless apparatus further comprises a second receiving module configured to receive a signal from a wireless device through a first wireless channel;
the receiving module is configured to receive a signal from a wireless device through a second wireless channel;
the first wireless channel is a wireless channel through which, at an arbitrary time point, a signal for allowing a wireless device to communicate with the wireless apparatus can be transmitted;
the second wireless channel is a wireless channel through which, only as a reply to the notification signal, a signal allowing a wireless device to communicate with the wireless apparatus can be transmitted; and
the suspending module does not suspend supply of power to the second receiving module even if the suspending module suspends the supply of power to the receiving module.

16. The wireless apparatus according to claim 1, wherein the second period is determined according to the number of wireless devices stored in the memory.

17. A wireless apparatus configured to send notification signals at intervals of a certain period, each notification signal including information for identification of the wireless apparatus, the wireless apparatus comprising:
a memory configured to store the number of wireless devices that are in such a state as to be able to communicate with the wireless apparatus;
a determining module configured to determine, before sending the notification signal, whether a wireless channel of the wireless apparatus to be used for sending the notification signal is being used by another wireless device;
a sending module configured to send the notification signal containing information indicative of a second period in which the wireless apparatus is controlled so that a signal transmitted from a wireless device is receivable, if the wireless channel has not been used by any other wireless devices throughout a first period;
a receiving module configured to receive a signal that enables a communication with the wireless apparatus;
a controller configured to control the receiving module so that a signal transmitted from another wireless device is receivable until a lapse of the second period after transmission of the notification signal; and
a suspending module configured to suspend supply of power to the receiving module of the wireless apparatus if a signal has not been received from any other wireless devices to the wireless apparatus in the second period and the number of wireless devices stored in the memory is zero, wherein:
if the receiving module receives a signal transmitted from another wireless apparatus in the second period, the controller controls the receiving module of the wireless apparatus so that said signal transmitted from said another wireless device is receivable even after a lapse of the second period.

18. The wireless apparatus according to claim 17, wherein, if the sending module sends a signal to a first wireless device or the receiving module receives a signal transmitted from the first wireless device by a lapse of the second period after the transmission of the notification signal, the sending module sends a signal to the first wireless device after the lapse of the second period.

* * * * *